United States Patent [19]

Shima et al.

[11] Patent Number: 4,623,876

[45] Date of Patent: Nov. 18, 1986

[54] ALARM SYSTEM TO TRANSMIT DETECTION INFORMATION DETECTED BY A DETECTOR DUE TO A RADIO SYSTEM

[75] Inventors: Hiroshi Shima; Hiroshi Honma, both of Tokyo, Japan

[73] Assignee: Hochiki Corporation, Tokyo, Japan

[21] Appl. No.: 694,168

[22] Filed: Jan. 23, 1985

[30] Foreign Application Priority Data

Jan. 27, 1984 [JP] Japan .......... 59-14025

[51] Int. Cl.⁴ .......... G08B 1/08; H04Q 7/00

[52] U.S. Cl. .......... 340/539; 340/531; 340/534; 340/536; 340/345; 340/870.09; 340/870.16; 340/825.06

[58] Field of Search .......... 340/539, 531, 693, 345, 340/346, 825.04, 825.06, 534, 536, 870.04, 870.06, 870.07, 870.09, 870.17, 870.16, 870.19, 870.24; 455/9, 63, 127

[56] References Cited

U.S. PATENT DOCUMENTS

| | | | |
|---|---|---|---|
| 3,848,231 | 11/1974 | Wootton | 340/539 |
| 4,020,477 | 4/1977 | Holland | 340/539 |
| 4,020,480 | 4/1977 | Gotley et al. | 340/693 |
| 4,027,276 | 5/1977 | Shaughnessy | 340/539 |
| 4,095,211 | 6/1978 | Shaughnessy | 340/539 |
| 4,101,873 | 7/1978 | Anderson et al. | 340/539 |
| 4,109,239 | 8/1978 | Davis | 340/539 |
| 4,153,881 | 5/1979 | Permut et al. | 340/539 |
| 4,160,246 | 7/1979 | Martin et al. | 340/539 |
| 4,189,720 | 2/1980 | Lott | 340/539 |
| 4,191,948 | 3/1980 | Stockdale | 340/539 |
| 4,232,308 | 11/1980 | Lee et al. | 340/539 |
| 4,322,724 | 3/1982 | Grudzinski | 340/595 |
| 4,357,602 | 11/1982 | Lemelson | 340/539 |
| 4,400,694 | 8/1983 | Wong et al. | 340/505 |
| 4,446,454 | 5/1984 | Pyle | 340/538 |
| 4,454,509 | 6/1984 | Buennagel et al. | 340/825.69 |
| 4,462,022 | 7/1984 | Stolarczyk | 340/539 |

*Primary Examiner*—Donnie L. Crosland
*Attorney, Agent, or Firm*—Wenderoth, Lind & Ponack

[57] ABSTRACT

When a transmitter receives an abnormal detection signal from a leaked gas alarm or the like, the transmitter starts the transmitting operation and repeatedly transmits the detection information together with the address information by a radio wave for a constant transmitting operation time interval. A receiver is of the intermittent reception type whereby the receiving operation is performed at every constant idle time, thereby preventing a consumption of a power source of a battery. When the transmitting radio wave is received at a timing of the intermittent reception, the receiving operation is continued and an alarm signal is generated on the basis of the last information which is transmitted due to the single transmitting operation, thereby allowing an alarm representing the leakage of gas to be generated and closing a gas shut-off valve, or the like.

7 Claims, 22 Drawing Figures

ALARM SYSTEM TO TRANSMIT DETECTION INFORMATION DETECTED BY A DETECTOR DUE TO A RADIO SYSTEM

BACKGROUND OF THE INVENTION

The present invention relates to an alarm system in which detected information from a detector to detect leakage of a gas, fire, theft, etc. is transmitted to a receiver due to a radio system.

For example, in alarm systems such as a leaked gas alarm, fire alarm apparatus, theft alarm apparatus, etc. which are used at home in group housing or the like, sensors and alarm units are installed indoors and when a sensor detects the abnormal condition, the corresponding alarm unit operates, thereby allowing an alarm buzzer or an alarm bell to generate an alarm sound. At the same time, the alarm unit serves to automatically report to a gas company, fire department, police station, etc. using a telephone line.

On the other hand, when the sensor transmits erroneous detection information due to malfunction, the alarm unit generates an erroneous alarm. To prevent this, the alarm unit alarms after the elapse of a constant time after completion of the transmission of the detection information from the sensor.

However, in the case where the detection information from a sensor is intermittently received and a signal is transmitted without synchronizing the sensor with the alarm unit in order to reduce an electric power consumption of the alarm unit, the time interval from the transmission of the sensor signal until an alarm is generated becomes unstable and also varies in dependence upon the receiving condition.

In the case where the abnormal condition such as leakage of gas, fire or the like occurs when a family is away from home, even if an alarm is generated in a room, it will be meaningless. Therefore, an alarm system whereby an alarm unit is attached at a location out of the room, e.g., a corridor or the like and thereby to inform the occurrence of abnormal situation to the outside has been put in a practical use.

However, in case of installing alarm units both indoors and outdoors, it is necessary to connect the alarm unit in the room with the alarm unit out of the room through a signal line. In addition, a power source has to be supplied from inside the room to the outside alarm unit. Consequently, in the alarm system whereby the alarm units are installed both inside and outside of the room, a construction to install a signal line by forming a hole in the wall has to be performed in order to connect both units with the signal line, so that this results in complication of the construction for installation and causes an economical demerit.

On the other hand, a problem on a power supply for the alarm unit which is attached outdoors can be solved by use of a battery in the outdoor unit. However, the service life of the battery is generally about one year and, for example, in the case where the battery energy is completely consumed when a family is away from home, the function of the outdoor alarm unit will have been lost; thus, periodical maintenance is needed.

SUMMARY OF THE INVENTION

It is an object of the present invention to provide an alarm system in which when a transmitting radio wave is received at a timing of the receiving window time, the transmitted information can be received by continuously supplying a power source from a battery to a receiving circuit for an interval over the receiving window time while the transmitting radio wave is being received.

Another object of the present invention is to provide an alarm system in which start signals are outputted to an alarm and control equipment upon completion of the reception and discrimination of the last information code among the information codes which are repeatedly transmitted from a transmitter.

Still another object of the present invention is to provide an alarm system in which detection information regarding leakage of a gas, fire, theft, etc. is transmitted from a transmitter attached indoors to a receiver installed outdoors due to a radio system, thereby eliminating the connection between the indoor and outdoor units through a signal line and enabling such an alarm system to be simply installed without requiring a construction for the signal line.

Further another object of the invention is to provide an alarm system in which even when alarm units according to a radio system are installed in a plurality of adjacent housings, the detection information can be accurately transmitted without causing a radio interference with the units in the other housings.

Further another object of the invention is to provide an alarm system in which only when an abnormal condition such as leakage of a gas or the like is detected by an indoor transmitter, this transmitter transmits detection information, thereby reducing an electric power consumption of the transmitter in the stationary observing state.

Further another object of the invention is to provide an alarm system in which when an abnormal condition is detected, an information code including address information and detection information is transmitted.

Further another object of the invention is to provide an alarm system in which when the detection information is obtained, the information code is repeatedly transmitted for a constant transmission time interval.

Further another object of the invention is to provide an alarm system in which a non-modulated carrier wave is transmitted as a preamble burst signal prior to transmission of an information code.

Further another object of the invention is to provide an alarm system in which a transmitter has a quick start delay off function whereby a power source is immediately supplied to a transmitting circuit section when the detection information is obtained and the power supply to the transmitting circuit section is slowly stopped after the elapse of a constant transmission time.

Further another object of the invention is to provide an alarm system in which intermittent receiving window times are set into a receiver installed outdoors and a power source is supplied from a battery to a receiving circuit only at the timing of this receiving window time to produce the state in that a transmitting radio wave can be received, so that an extremely small receiving electric power consumption is required, thereby enabling the service life of the battery to be sufficiently extended to about ten years.

Further another object of the invention is to provide an alarm system in which the information regarding the information code number is transmitted together with the address information and detection information in order to allow a receiver to receive and discriminate the last information code.

Further another object of the invention is to provide an alarm system in which the time information indicative of the elapse of time from the time when the detection information was received is transmitted together with the address information and detection information in order to allow a receiver to discriminate the last information code.

These and other objects, features and advantages of the invention will become apparent from the following description taken in conjunction with the accompanying drawings.

DESCRIPTION OF PREFERRED EMBODIMENTS

Figure 1:
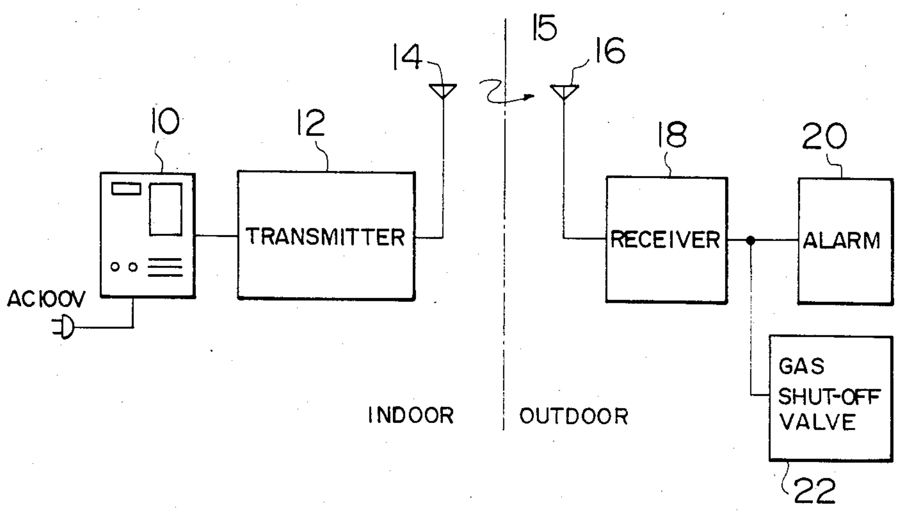
FIG. 1 is an explanatory diagram showing a system arrangement of the present invention.

FIG. 1 shows a system arrangement of the present invention. A leaked gas alarm 10 and a transmitter 12 to transmit detection information in accordance with a leaked gas detection output from the leaked gas alarm 10 together with address information are installed indoors on the left side of a wall 15 as a boundary. The leaked gas alarm 10 uses a power source which is supplied from a commercially available AC 100 V and outputs a voltage signal at 6 V in the ordinary observing state in that no gas leaks. When the alarm 10 detects the leakage of a gas, it outputs a voltage signal at 12 V. Further, when the alarm 10 detects a trouble of voltage drop of the power supply, it outputs a voltage signal at 0 V. For example, SC-300L(B) made by Tokyo Gas Co., Ltd. may be used as the leaked gas alarm 10. The transmitter 12 receives a power source from the commercially available AC 100 V and operates and executes the transmitting operation only when the detecting state of the leaked gas alarm 10 changes. Namely, when the detecting state of the leaked gas alarm 10 changes from the stationary observing state to the state in that the leakage of gas is detected (i.e., when the output voltage varies from 6 V to 12 V), the transmitter 12 is made operative and transmits the detection information together with the address information from a transmitting antenna 14 by way of an FM radio wave.

A receiver 18 equipped with a receiving antenna 16, an alarm 20 and a gas shut-off valve 22 are installed outdoors shown on the right side of the wall 15. The receiver 18 receives a radio wave transmitted from the transmitter 12 and discriminates the detection information and address information. When the leaked gas is detected, the receiver 18 allows the alarm 20 to indicate and alarm the leakage of gas and simultaneously drives the gas shut-off valve 22 to shut off the supply of the gas.

On the other hand, the receiver 18 includes a battery as a power source therein and performs the receiving operation for the transmitting radio wave only at the intermittent receiving window times in order to reduce an energy consumption of the battery as will be explained in detail later.

Figure 2:
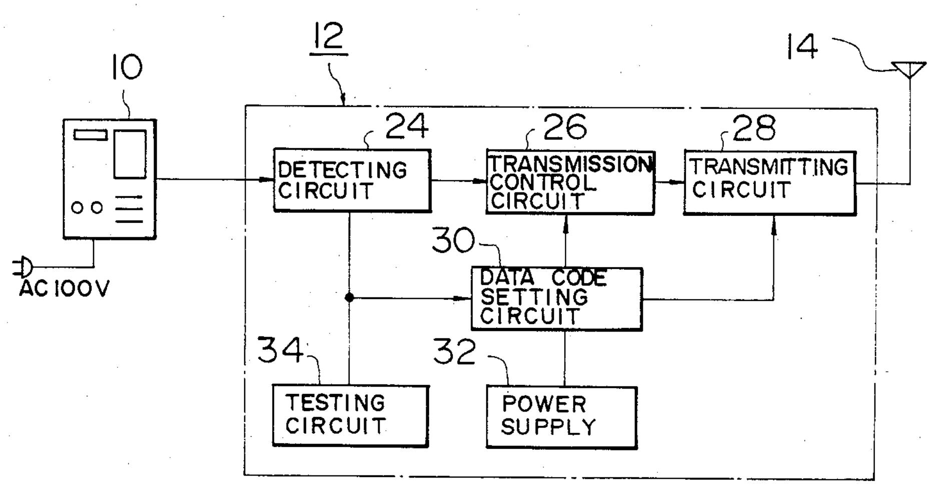
FIG. 2 is a block diagram showing a fundamental arrangement of a transmitter.

FIG. 2 shows a circuit arrangement of the receiver 12 in FIG. 1. In FIG. 2, a detecting circuit 24 detects the voltage signal at 12 V when the leaked gas is detected by the leaked gas alarm 10 and may be realized by a voltage comparator. A leaked gas detection output discriminated by the detecting circuit 24 is supplied to a transmission control circuit 26. When the transmission control circuit 26 receives the detection signal indicative of the leakage of gas from the detecting circuit 24, it supplies a power source to a transmitting circuit 28 to produce the transmitting state for a predetermined constant time, e.g., for eighty seconds. This power supply to the transmitting circuit 28 is performed in a manner such that an interrupting time of the power supply for about 2.5 seconds is provided after the power supply for 80 seconds and the power supply for 80 seconds and the interruption of the power supply for 2.5 seconds are repeated while the leaked gas detection signal is derived.

The leaked gas detection signal of the detecting circuit 24 is also supplied to a data code setting circuit 30. The data code setting circuit 30 outputs an information code pulse of which one word is constituted by the address information and detection information to the transmitting circuit 28 on the basis of the leaked gas detection signal of the detecting circuit 24. The number of information pulse codes which are supplied from the data code setting circuit 30 for 80 seconds when the transmitting circuit 28 is operating due to the power supply is, for instance, 2048. Therefore, for 80 seconds of one operating time, the transmitting circuit 28 frequency modulates a plurality of information pulse codes which are supplied from the data code setting circuit 30 and transmits them as the FM radio wave in the VHF or UHF band from the transmitting antenna 14.

A power supply 32 receives a power supply from the commercially available AC 100 V and produces a constant DC voltage necessary for each circuit. A testing circuit 34 is equipped with a test switch. When this test switch is operated, the leaked gas detection signal based on the injection of an inspection gas is supplied to the data code setting circuit 30, and the information code pulse including the address information and detection information is supplied to the transmitting circuit 28 in a similar manner as in the case where the leaked gas detection signal at 12 V is discriminated by the detecting circuit 24, thereby allowing the transmitting circuit 28 to transmit the FM radio wave for the test from the transmitting antenna 14.

Figure 3:
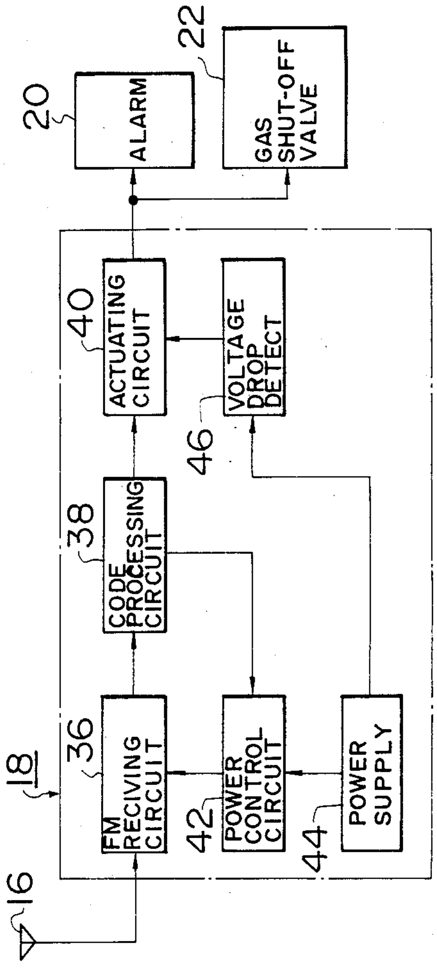
FIG. 3 is a block diagram showing a fundamental arrangement of a receiver.

FIG. 3 is a circuit diagram of the receiver 8 in FIG. 1. In FIG. 3, an FM receiving circuit 36 detects the FM radio wave received by the receiving antenna 16 and reproduces the information code pulse transmitted and supplies it to a code processing circuit 38. The code processing circuit 38 compares the address information included in the information code pulse with the self address information which has been preliminarily assigned. When both information coincide, the code processing circuit 38 interprets the detection information and generates a processing signal corresponding to the leakage of gas to an actuating circuit 40 on the basis of the result of interpretation of the detection information, for instance, of the leaked gas detection information. When the actuating circuit 40 receives the processing signal based on the discrimination of the leakage of gas from the code processing circuit 38, it outputs a start signal to the alarm 20 and gas shut-off valve 22, thereby allowing the alarm 20 to indicate an alarm representing the leakage of gas and closing the gas shut-off valve 22 to stop the supply of the gas.

A power control circuit 42 supplies a power source to set the intermittent receiving window times to the FM receiving circuit 36. Namely, the power control circuit 42 allows a power supply circuit 44 using a lithium battery to intermittently supply the power source to the FM receiving circuit 36. The time when the power source is intermittently supplied is set as the receiving window time in the FM receiving circuit 36. The receiver 18 can receive the transmitting radio wave only within this receiving window time. As the receiving window time which is set in the FM receiving circuit 36 by the intermittent power supply due to the power control circuit 42, for instance, the power supply interrupting time of 76 seconds is provided after the power supply for 80 milliseconds. The power supply for 80 milliseconds and the interruption of the power supply for 76 seconds are repeated. It should be noted that the time of single transmission by the transmitter 12 of FIG. 2 is 80 seconds, while the interval between the receiving window times of 80 milliseconds in the receiver 18 is set to a short time of 76 seconds. In this way, by setting the interval between the receiving window times to a shorter time of 76 seconds as compared with 80 seconds of the transmitting time, the single receiving window time is certainly included in the transmitting time for 80 seconds even if the reception timing is not synchronized with the transmission timing. On the other hand, when the first information pulse is received and discriminated by the code processing circuit 38, a signal to continue the power supply for a time interval over the receiving window time is supplied to the power control circuit 42. In response to this signal from the code processing circuit 38, the power control circuit 42 continuously supplies the power source to the FM receiving circuit 36 until the completion of the reception of the transmitting radio wave for 80 seconds.

Figure 4:
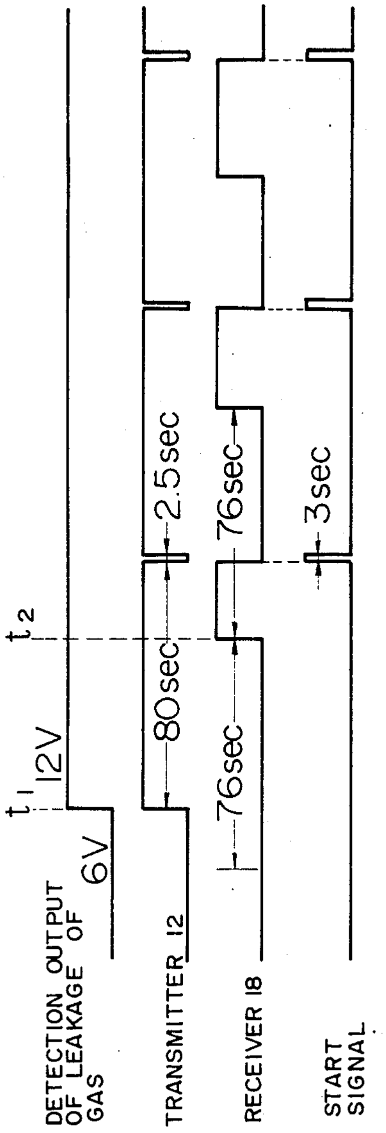
FIG. 4 is a general timing chart showing the transmitting and receiving operations when leakage of a gas is detected.

A voltage drop detector 46 for a battery observes the output voltage of the lithium battery provided in the power supply circuit 44. When the voltage of the battery drops to a level of a constant voltage or less, the detector 46 outputs a detection signal representing the voltage drop of the battery to the actuating circuit 40, thereby allowing the alarm 20 to indicate and alarm the voltage drop of the battery. The detector 46 also supplies a start signal to the gas shut-off valve 22, thereby executing the fail safe operation to stop the supply of the gas by closing the gas shut-off valve 22 since the normal receiving operation is not performed when the battery voltage drops. Next, the transmitting and receiving operations by the transmitter 12 of FIG. 2 and by the receiver 18 of FIG. 3 will be described with reference to a general timing chart of FIG. 4. In FIG. 4, when the leaked gas alarm 10 detects the leakage of gas at time $t_1$, the output voltage changes from 6 V so far to 12 V. The output voltage at 12 V of the leaked gas alarm 10 which is obtained at time $t_1$ is discriminated by the detecting circuit 24 in the transmitter 12, so that the transmission control circuit 26 supplies a power source to the transmitting circuit 28 for 80 seconds. Simultaneously, the detection output of the detecting circuit 24 is given to the data code setting circuit 30, so that the data code setting circuit 30 repeatedly outputs the information code pulse including the address information and leaked gas detection information for 80 seconds when the transmitting circuit 28 is operating. Consequently, the information pulse code is repeatedly transmitted, for example, 2048 times from the receiver 12 during 80 seconds from time $t_1$ when the leakage of gas was detected. Upon completion of the transmitting operation for 80 seconds, the transmitting control circuit 26 again performs the transmitting operation for 80 seconds when the leakage of gas is successively detected after the elapse of the idle time for 2.5 seconds.

On the other hand, in the receiver 18 of FIG. 3, the power control circuit 42 repeatedly sets the receiving window time at which the power source voltage from the power supply circuit 44 is applied to the FM receiving circuit 36 for 80 milliseconds at the interval of 76 seconds. Thus, the transmitting radio wave is received by the receiving operation of the FM receiving circuit 36 at time $t_2$ due to the setting of the receiving window time of 80 milliseconds. The information code pulse reproduced by the FM receiving circuit 36 is subjected to the discrimination between the transmitted address information and the self address information to see if they coincide or not by the code processing circuit 38. When they are coincident, the code processing circuit 38 outputs a signal to instruct the continuation of the power supply for a time interval exceeding the receiving window time to the power control circuit 42. Therefore, the receiver 18 holds the receiving state of the transmitting radio wave from time $t_2$. After the elapse of the transmitting time of 80 seconds, when the last information pulse code is received and it is detected that the no transmitting radio wave is transmitted any more, the code processing circuit 38 stops the generation of the signal to instruct the continuation of the power supply. Thus, the power control circuit 42 stops the power supply and stops the receiving operation.

In the receiving operation from time $t_2$, the code processing circuit 38 discriminates the address information and interprets the detection information whenever the information code signal is derived. Upon completion of the discriminating process of the last information code pulse, the code processing unit 38 outputs a processing signal based on the content of the detection information, i.e., the leaked gas detection information to the actuating circuit 40. In response to this processing signal, the actuating circuit 40 outputs a start signal having a pulse duration of about three seconds to the alarm 20 and gas shut-off valve 22. In the alarm 20, the leakage of gas is alarmed and indicated due to the operations of the leaked gas indicating lamp and buzzer. Also, an electromagnetic solenoid of the gas shut-off valve 22 is driven to close the valve.

As described above, even if the leakage of gas is alarmed and the supply of the gas is shut off due to the reception and discrimination of the leaked gas signal on the basis of the transmitting radio wave from the transmitter 12, when the leakage of gas is redetected, the transmitter 12 again transmits the FM radio wave for 80 seconds after expiration of the idle time of 2.5 seconds. The receiver 18 receives this transmitting radio wave and also repeats the similar receiving operation at every receiving window time and repeats the operation to output the start signal whenever the last information code pulse is derived. In this way, when the code processing circuit 38 detects that no radio wave is transmitted from the transmitter 12, the receiver 18 outputs the processing signal to the actuating circuit 40. While the gas is leaking, the receiving operation as mentioned above is repeated.

A feature of this arrangement will then be explained with reference to FIGS. 5 and 6.

Figure 5:
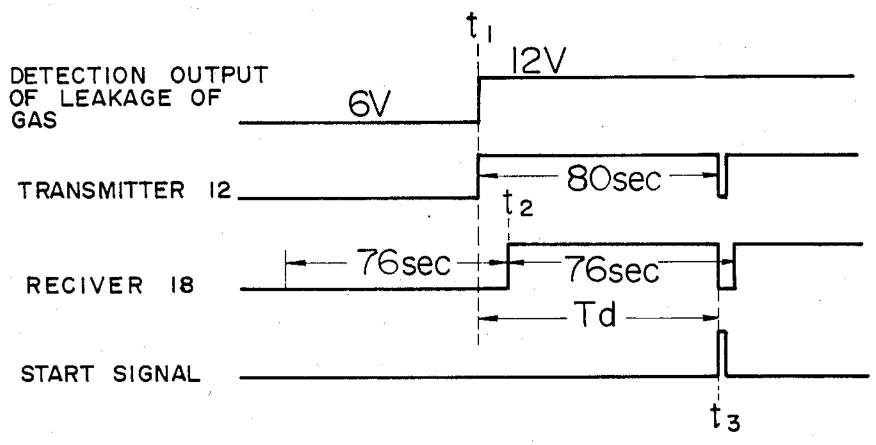
FIG. 5 is a timing chart showing the delay time from the detection of the leaked gas until the detection signal is received and an alarm is generated in the case where there is a small time lag between the transmission timing and the reception timing.

FIG. 5 is a general timing chart showing the relation between the transmission timing of the transmitter and the reception timing of the receiver when the leakage of gas occurs, in which the operation in the case where there is a small time lag between the transmission timing and the reception timing is shown.

Namely, in the case where the leakage of gas is detected at time $t_1$ and the FM radio wave is transmitted for 80 seconds, the receiver 18 detects the absence of the transmitting radio wave from the transmitter 12 and thereafter it outputs the start signal. Therefore, when the timing of the receiving window time appears at time $t_2$ immediately after time $t_1$, no start signal is outputted for the interval from the receiving window time at time $t_2$ until the completion of the transmission for 80 seconds, but the start signal is generated at time $t_3$ when the transmission for 80 seconds is finished.

The delay time from time $t_1$ when the leaked gas is detected until time $t_3$ when the start signal is outputted is represented by $T_d$.

Figure 6:
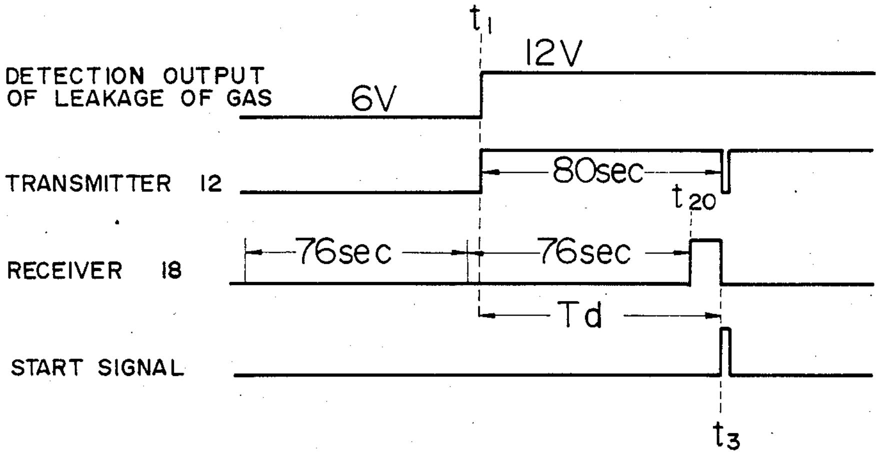
FIG. 6 is a timing chart showing the delay time from the detection of the leaked gas until the detection signal is received and an alarm is generated in the case where there is a large time lag between the transmission timing and the reception timing.

FIG. 6 is a general timing chart showing the transmitting and receiving operations in the case where there is a large time lag between the transmission timing and the receiving window time. The FM radio wave is transmitted for 80 seconds after time $t_1$ when the leakage of gas is detected. In the case where the receiving window time is largely shifted as indicated at time $t_{20}$ from the transmission timing, the start signal is outputted at time $t_3$ at the end of transmission and the delay time $T_d$ is also the same as in FIG. 5 in this case.

Namely, in the transmitting and receiving operations in the present invention, the delay time $T_d$ from the detection of the leaked gas on the transmission side until the leakage of gas is alarmed and the supply of the gas is shut off on the reception side on the basis of the reception and discrimination of such leaked gas detection signal always becomes constant irrespective of the time lag between the transmission and reception timings.

Figure 7:
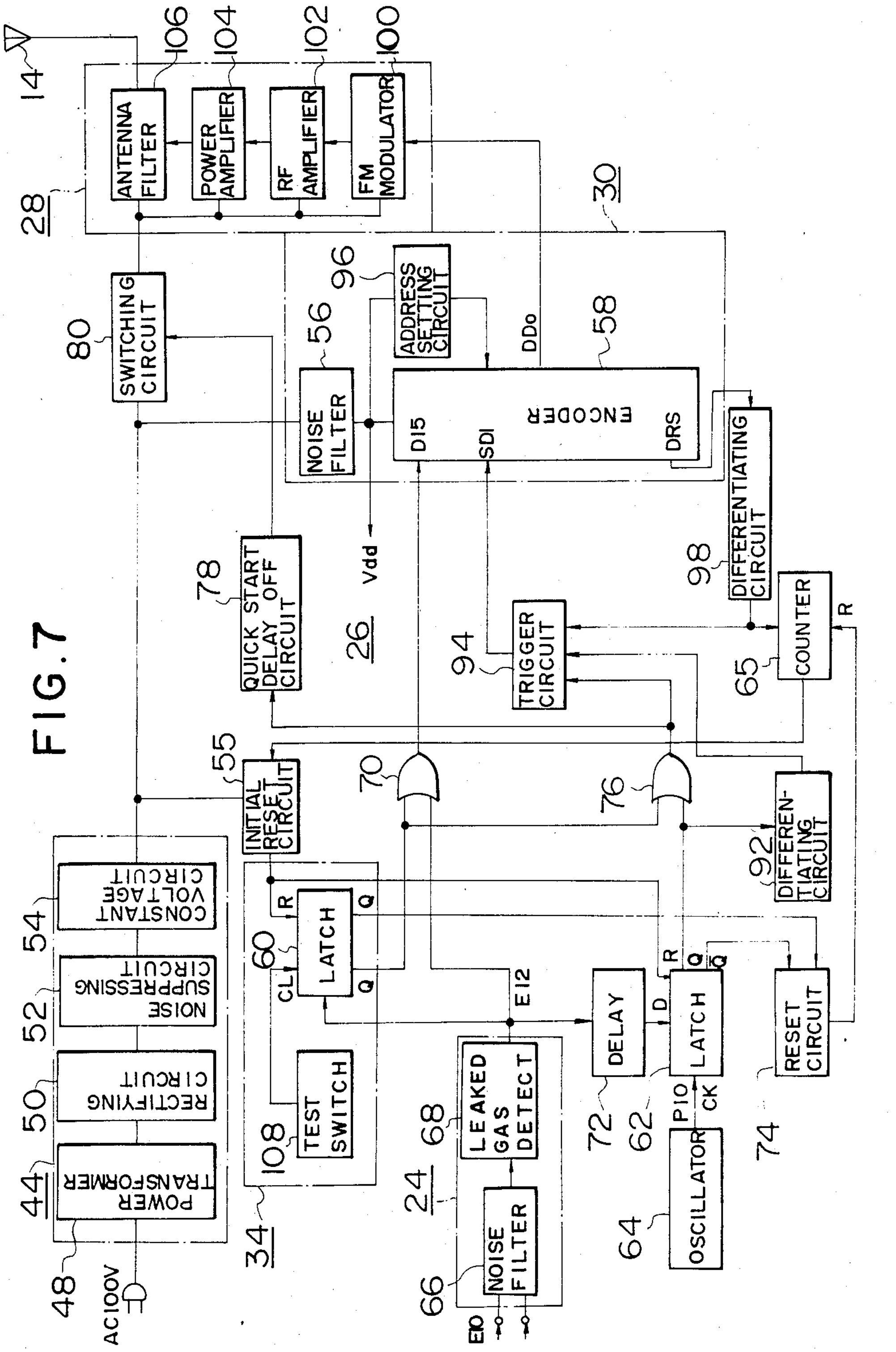
FIG. 7 is a block diagram showing an embodiment of the transmitter.

FIG. 7 is a block diagram showing a practical circuit of the transmitter 12 of the invention.

In FIG. 7, a power source is supplied to the power supply circuit 44 from the commercially available AC 100 V and is dropped to about 20 V by a power transformer 48 and is converted to the direct current by a rectifying circuit 50. Thereafter, the power source voltage at 12 V is generated by a constant voltage circuit 54 through a noise suppressing circuit 52. The output of the constant voltage circuit 54 is supplied as the power source to an encoder 58 through a noise filter 56 provided in the data code setting circuit 30. The output of the noise filter 56 is also supplied as the power voltage $V_{dd}$ to another circuit section constituted by a C-MOS IC.

The output of the constant voltage circuit 54 is also applied to an initial reset circuit 55 and the initial reset circuit 55 initializes a latch circuit 60 in the testing circuit 34 and a latch circuit 62 to latch the leaked gas signal when the power supply is turned on. An oscillator 64 oscillates a clock pulse $P_{10}$ of a period of about 2.5 seconds due to the turn-on of the power supply, thereby periodically discriminating the presence or absence of the leaked gas signal.

The detecting circuit 24 is constituted by a noise filter 66 and a leaked gas detector 68. The noise filter 66 removes the noise included in an output voltage $E_{10}$ of the leaked gas alarm 10. The leaked gas detector 68 discriminates the input voltage $E_{10}$ over 10 V and outputs a leaked gas signal $E_{12}$. Therefore, when the output voltage $E_{10}$ of the leaked gas alarm 10 in the stationary observing state is 6 V, the leaked gas detector 68 does not output the leaked gas signal $E_{12}$.

The leaked gas signal $E_{12}$ of the leaked gas detector 68 is inputted to a data bit terminal $D_{15}$ of the encoder 58 through an OR gate 70. The leaked gas signal $E_{12}$ is also inputted to a data terminal D of the latch circuit 62 through a delay circuit 72 for removal of the noise. The latch circuit 62 may be constituted by a D type flip flop such as, for example, the TC4013DP made by Toshiba Co., Ltd. or the like and inverts output terminals Q and $\overline{Q}$ and latches the leaked gas signal $E_{12}$ in response to the leading edge of the clock pulse $P_{10}$ from the oscillator 64 after the leaked gas signal $E_{12}$ was inputted as the data signal. The $\overline{Q}$ output of the latch circuit 62 inverted due to the latch of the leaked gas signal $E_{12}$ releases the reset of a counter 65 through a reset circuit 74. The Q output of the latch circuit 62 inverted due to the latch of the leaked gas signal $E_{12}$ actuates a quick start delay off circuit 78 through an OR gate 76. The quick start delay off circuit 78 actuated by an output of the OR gate 76 supplies a switch control signal to a switching circuit 80, so that the switching circuit 80 is immediately turned on and supplies the power source voltage from the power supply circuit 44 to the transmitting circuit 28. Namely, when the leaked gas signal $E_{12}$ is outputted, the transmitting circuit 28 immediately receives the power supply and enters the transmitting operation state.

Figure 8:
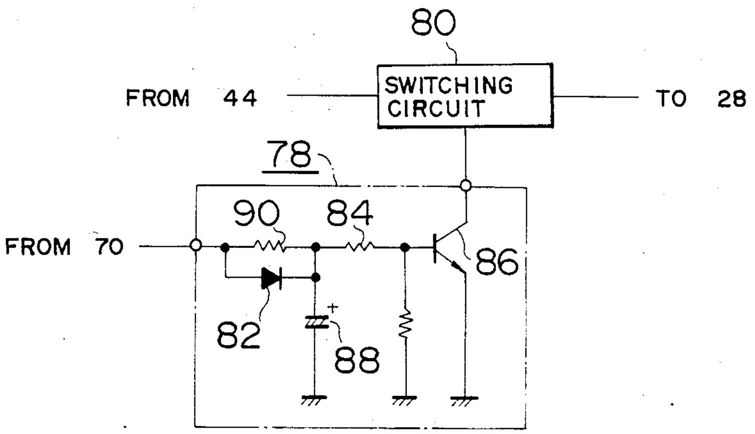
FIG. 8 is a circuit diagram of a quick start delay off circuit in the embodiment of FIG. 7.

The quick start delay off circuit 78 has a circuit arrangement shown in FIG. 8. Namely, when the latch output of the leaked gas signal is supplied through the OR gate 76 to the quick start delay off circuit 78, a transistor 86 is immediately turned on through a diode 82 and a resistor 84. The switching circuit 80 is turned on due to the conduction of the transistor 86. On one hand, when the latch output from the OR gate 76 is disconnected, a capacitor 88 in the charging state starts slowly discharging through a resistor 90, so that the base bias voltage of the transistor 86 gradually drops, thereby allowing the delay off of the transistor 86 to be performed. Thus, when the leaked gas signal is detected, the switching circuit 80 is soon turned on and supplies the power source to the transmitting circuit 28. On the contrary, when the leaked gas signal is not generated, the switching circuit 80 slowly stops the power supply to the transmitting circuit 28.

Referring again to FIG. 7, when the leaked gas signal $E_{12}$ is latched, the Q output of the latch circuit 62 is supplied to a differentiating circuit 92 and the differentiating circuit 92 supplies a differential pulse to a trigger circuit 94. The Q output of the latch circuit 62 is also supplied to the trigger circuit 94 through the OR gate 76. When the trigger circuit 94 receives the differential pulse of the differentiating circuit 92 and the Q output from the OR gate 76, it supplies a trigger signal to an SDI terminal of the encoder 58. In response to the trigger signal inputted at the SDI terminal, the encoder 58 outputs an information code pulse to the transmitting circuit 28 from a $DD_0$ terminal. The information code pulse which is generated from the encoder 58 is constituted by a character code of which one word consists of: a preamble burst signal having a function as a transmission pilot signal; an address signal set by an address setting circuit 96; and a leaked gas data signal based on the leaked gas signal $E_{12}$ inputted to the data bit terminal $D_{15}$. This character code is outputted as the serial data to the transmitting circuit 28. For instance, ED-15 made by Super Tech Co., Ltd. may be used as the encoder 58. Upon completion of one transmission of the information code pulse, the encoder 58 generates a pulse signal to a DRS terminal. The pulse signal at the DRS terminal of the encoder 58 is inputted to a differentiating circuit 98. When the differentiating circuit 98 receives the pulse signal from the DRS terminal, it outputs a differential pulse to the trigger circuit 94 and counter 65. In response to the differential pulse from the differentiating circuit 98, the trigger circuit 94 supplies the trigger signal to the SDI terminal of the encoder 58. In response to this trigger signal, the encoder 58 again outputs the information code pulse to the transmitting circuit 28 and upon completion of the generation of the information code pulse, it regenerates the pulse signal to the DRS terminal.

The counter 65 counts the differential pulse of the differentiating circuit 98 and when it counts, e.g., 2048 differential pulses, the counter 65 supplies a counter output to the initial reset circuit 55. When the initial reset circuit 55 receives the output of the counter 65, it supplies a reset signal to the latch circuit 62, thereby releasing the latch of the leaked gas signal $E_{12}$. In other words, the counting time of the differential pulses in the counter 65 determines a single transmitting time. When 2048 differential pulses are counted, the transmitting time for about 80 seconds is obtained.

When the latch of the leaked gas signal $E_{12}$ in the latch circuit 62 is released in response to the output of the counter 65, the latch circuit 62 again latches the leaked gas signal $E_{12}$ at the next leading edge of the clock pulse $P_{10}$ from the oscillator 64 in the case where the gas is still leaking. The transmitting operation based on this latch output is repeated. That is, after the transmitting time for 80 seconds based on the count value 2048 of the counter 65 has passed, the interruption is provided for 2.5 seconds as the idle time based on the period of the clock pulse $P_{10}$, then the transmitting operation for 80 seconds is again repeated.

The transmitting circuit 28 comprises a frequency modulator 100, a high frequency amplifier 102, a power amplifier 104, and an antenna filter 106. The transmitting circuit 28 frequency modulates the carrier frequency with the information code pulse which is outputted from the encoder 58 and transmits the FM radio wave at a frequency of 70.5 MHz having a frequency deviation of $\pm 20$ kHz from the transmitting antenna 14 using the helical antenna.

When the leaked gas signal $E_{12}$ disappears during the transmission of the FM radio wave for 80 seconds on the basis of the leaked gas signal $E_{12}$, the leaked gas signal $E_{12}$ is not supplied any more to the data bit terminal $D_{15}$ of the encoder 58. In addition, the latch of the latch circuit 62 is released and the trigger signal is not supplied to the SDI terminal of the encoder 58 from the trigger circuit 94, so that the generation of the information pulse code due to the encoder 58 is stopped. Further, the switching circuit 80 is also turned off through the quick start delay off circuit 78, thereby causing the operation of the transmitting circuit 28 to be stopped. The counter 65 is reset in response to the output of the reset circuit 74 on the basis of the release of the latch. Namely, when the leaked gas signal disappears during the transmitting operation, the transmitting operation is stopped and this results in the same state as that whereby the last information code pulse was transmitted to execute the alarm operation based on the reception of the alarm on the reception side.

Although the leaked gas signal $E_{12}$ is also supplied to the data terminal of the latch circuit 60 in the testing circuit 34, the latch operation is not performed since a test switch 108 is disconnected. This test switch 108 in the testing circuit 34 is used to carry out the operation test by injecting an inspection gas for test to the leaked gas alarm 10. Practically speaking, when the inspection gas is injected to the leaked gas alarm 10 for about 20 seconds, the alarm buzzer provided in the leaked gas alarm 10 blows and the output voltage $E_{10}$ at 12 V is simultaneously supplied to the detecting circuit 24. Therefore, if the alarm buzzer blows by injecting the inspection gas to the leaked gas alarm 10 for about 20 seconds, the test switch 108 is connected, thereby allowing the leaked gas signal $E_{12}$ to be latched to the latch circuit 60. The test switch 108 includes an oscillator therein and supplies a clock to the latch circuit 60 when the switch is connected. Therefore, even if the leaked gas signal $E_{12}$ disappears after the injection of the inspection gas for about 20 seconds, the latch state of the leaked gas signal $E_{12}$ is maintained in the latch circuit 60. Thus, the latch output Q of the latch circuit 60 is supplied to the OR gate 70, thereby allowing the leaked gas signal to be continuously supplied to the data bit terminal $D_{15}$ of the encoder 58. Namely, at the time of inspection, the leaked gas signal $E_{12}$ from the detecting circuit 24 is supplied to the data bit terminal $D_{15}$ of the encoder 58 for the first 20 seconds when the inspection gas is injected. After the elapse of 20 seconds, the leaked gas signal is continuously supplied to the data bit terminal $D_{15}$ of the encoder 58 due to the Q output of the latch circuit 60 based on the connection of the test switch 108. The input state of the leaked gas signal to the data bit terminal $D_{15}$ is held until the completion of the transmission of the information code pulse as many as a plurality of times for 80 seconds in the encoder 58. The end of the information code pulse is informed in a similar manner as in the foregoing case of the leakage of gas; namely, when the counter 65 counts 2048 information code pulses, it generates an output signal to the initial reset circuit 55. The initial reset circuit 55 supplies a reset signal to the latch circuit 60 in response to that output signal. However, the latch circuit 60 does not latch again since the leaked gas signal $E_{12}$ is not inputted because 80 seconds have already passed.

Consequently, about 20 seconds are enough as the injecting time of the inspection gas to the leaked gas alarm 10. There is no need to inject the inspection gas for the residual 60 seconds.

The TC4013BP made by Toshiba Co., Ltd. may be used as the latch circuit 60 in FIG. 7 similarly to the latch circuit 62. On one hand, the HD14040BP made by Hitachi, Ltd. may be used as the counter 65 to determine the transmitting time of 80 seconds.

Figure 9:
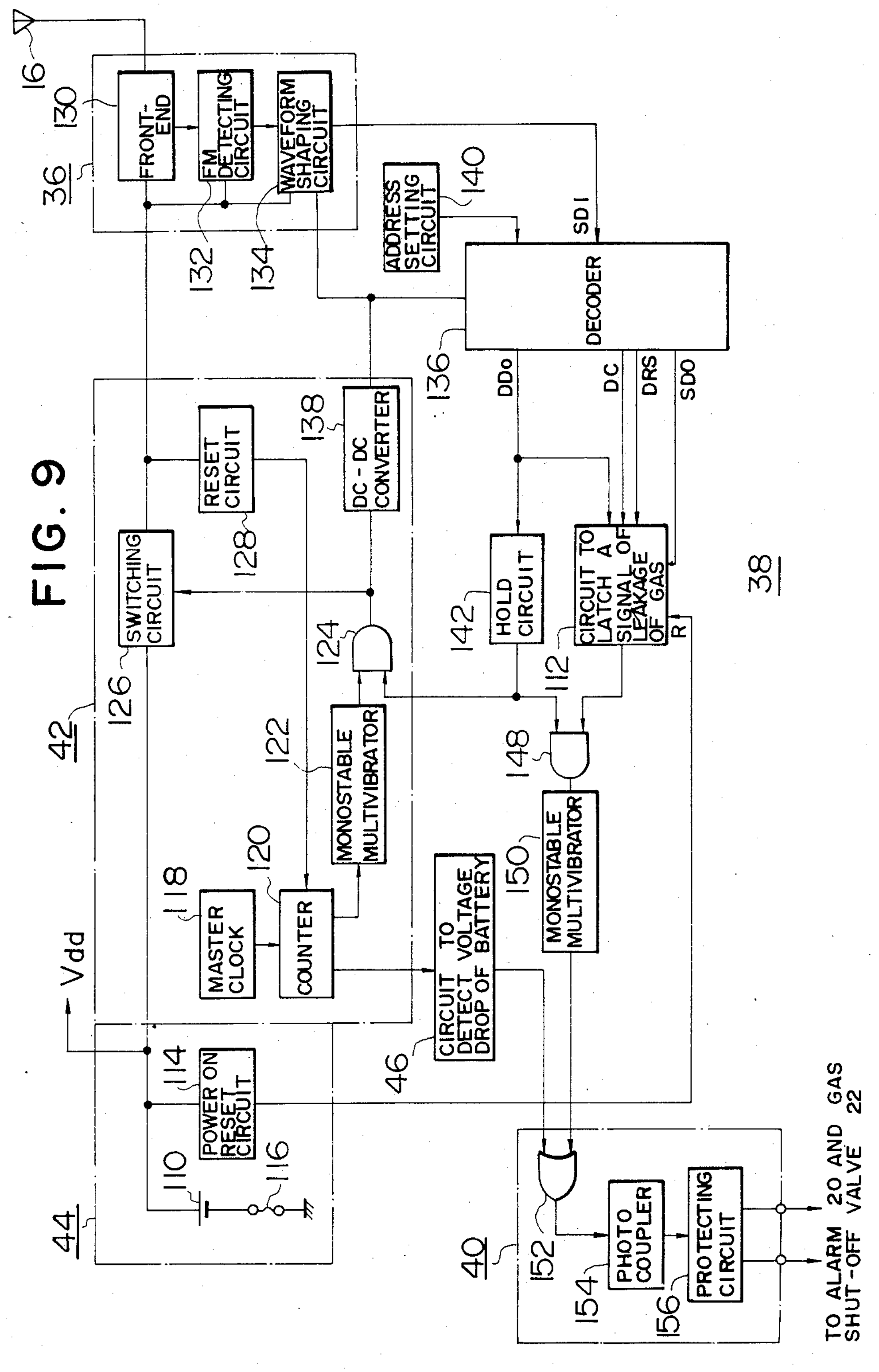
FIG. 9 is a block diagram showing an embodiment of the receiver.

FIG. 9 is a block diagram showing a practical embodiment of the receiver 18 of the present invention.

In FIG. 9, the power supply circuit 44 is provided with a lithium battery 110 and further a power on reset circuit 114 to initialize a leaked gas signal latch circuit 112 when the lithium battery 110 is connected. Also, a protecting fuse 116 is connected in series to the lithium battery 110. The power source voltage $V_{dd}$ at about 3 V is outputted from the power supply circuit 44.

A master clock 118 provided in the power control circuit 42 comprises a frequency divider using an oscillating output at 32.768 kHz of a crystal resonator as a reference frequency and generates a clock pulse of 31.25 milliseconds at a period of 2.0 seconds. The clock pulse from the master clock 118 is counted by a counter 120. When the counter 120 counts 38 clock pulses, it triggers a monostable multivibrator 122. That is, when the count value of the counter 120 becomes 38, the counter 120 triggers the monostable multivibrator 122 after the elapse of 76 seconds. The monostable multivibrator 122 ordinarily generates a signal at an H level. When the multivibrator 122 is triggered by the count output of the counter 120, it generates an L-level pulse of about 80 milliseconds. Thus, an L-level signal is outputted from an AND gate 124 through which a switching circuit 126 is turned on for about 80 milliseconds. The switching circuit 126 is turned on when an L-level signal is inputted. Therefore, the power source is intermittently supplied to the FM receiving circuit 36 on the basis of the switch-on for 80 milliseconds after expiration of the switch-off time for about 76 seconds. The receiving window time of the FM receiving circuit 36 is set due to the on-off operation of the switching circuit 126. A reset circuit 128 is arranged on the output side of the switching circuit 126 and the counter 120 is reset by the reset circuit 128 which detects the switch-on of the switching circuit 126.

The FM receiving circuit 36 receives the FM radio wave at 70.5 MHz with the receiving antenna 16 using the helical antenna. This FM radio wave is converted to the intermediate frequency at 10.7 MHz by a front-end 130 and is demodulated to the information code pulse by an FM detecting circuit 132. Thereafter, the waveform of this demodulated signal is shaped by a waveform shaping circuit 134 and is supplied to an SDI terminal of a decoder 136 in the code processing circuit 38.

On the other hand, an output of the AND gate 124 in the power control circuit 42 is supplied to a DC-DC converter 138 and is substantially tripled to 9 V. This step-up voltage of the DC-DC converter 138 is applied as the power sources to the waveform shaping circuit 134 in the FM receiving circuit 36 and to the decoder 136.

The decoder 136 decodes the demodulated signal from the FM receiving circuit 36 and outputs an address coincidence signal from a terminal $DD_0$ to an address coincidence hold circuit 142 when the decoder 136 discriminates that the set address of an address setting circuit 140 and the reception address are coincident. The address coincidence hold circuit 142 has a holding time over the transmission interval of the information code pulse transmitted from the transmission side and sets the output of the AND gate 124 at an L level while the hold output is obtained, thereby keeping the switching circuit 126 in the ON state.

The decoder 136 has a data clock terminal DC, a data reset terminal DRS and a serial data out terminal SDO. Outputs at these terminals are supplied to the leaked gas signal latch circuit 112. The latch circuit 112 latches the output when the leaked gas detection information is discriminated from the received information in the decoder 136. For example, the ED-15 made by Super Tech Co., Ltd. may be used as the decoder 136. On one hand, a circuit shown in FIG. 10 may be used as the leaked gas signal latch circuit 112.

Figure 10:
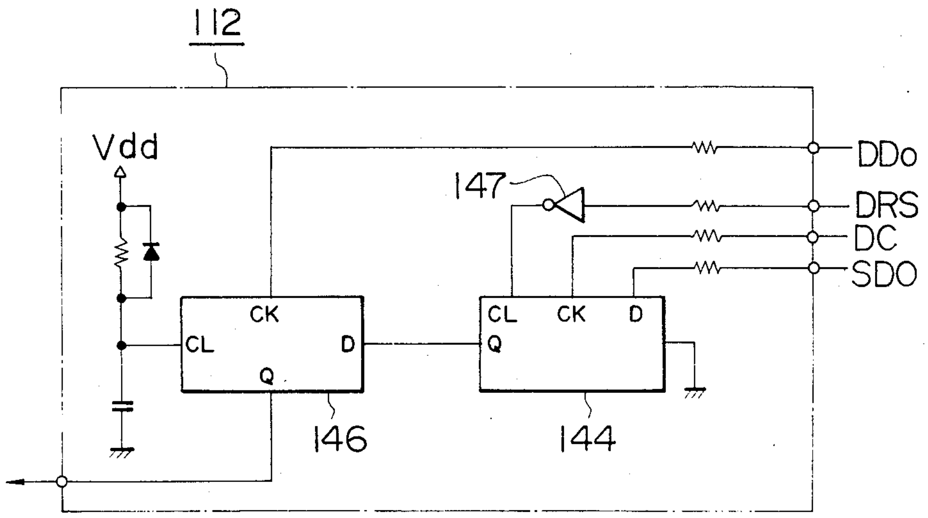
FIG. 10 is a circuit diagram showing a practical example of a latch circuit for a leaked gas signal in the embodiment of FIG. 9.

In FIG. 10, the leaked gas signal latch circuit 112 comprises D type flip flops 144 and 146 and, for instance, the TC4013BP made by Toshiba Co., Ltd. may be used. The DRS terminal of the decoder 136 is connected through an inverter 147 to a clear terminal CL of the flip flop 144; the DC terminal is connected to a clock terminal CK; and further the SDO terminal is connected to a data terminal D. On the other hand, the $DD_0$ terminal of the decoder 136 is connected to a clock terminal CK of the flip flop 146; the power source voltage $V_{dd}$ is connected as the reset release signal to a clear terminal CL; an output Q of the flip flop 144 is connected to a data terminal D; and further a Q output of the flip flop 146 is fetched as a leaked gas latch output.

In the operation of this leaked gas signal latch circuit 122, when the addresses are determined to be coincident by the decoder 136, the DRS terminal becomes an H level and the reset of the flip flop 144 is released due to the inversion to an L level by the inverter 147. The SDO terminal is held at an H level while the data signal representing the leakage of gas is obtained. Also, the data clock is derived from the DC terminal whenever the data signal is received. Thus the flip flop 144 is inverted and generates the latch output to set the output Q at an H level. This latch output is latched by the flip flop 146 when the $DD_0$ terminal becomes an H level because of coincidence of the addresses and generates the latch output of the leaked gas signal from the output Q. On the other hand, when the leaked gas signal disappears during the reception, the SDO terminal becomes an L level and the latch by the flip flop 144 is released and the latch output of the leaked gas signal due to the flip flop 146 at the next stage is also released.

Referring again to FIG. 9, the outputs of the leaked gas signal latch circuit 112 and address coincidence hold circuit 142 are inputted to an AND gate 148. When the holding by the hold circuit 142 is released, the AND gate 148 generates an H-level output and triggers a monostable multivibrator 150. Namely, when the reception and discrimination of the last information code pulse by the decoder 136 are finished and the coincidence signal is not derived from the $DD_0$ terminal, the output of the hold circuit 142 returns to an H level after the elapse of a constant holding time. At this time, the AND gate 148 triggers the monostable multivibrator 150.

The monostable multivibrator 150 outputs a pulse for about three seconds and supplies it to the actuating circuit 40. The actuating circuit 40 supplies the pulse of the multivibrator 150 to a photo coupler 154 through an OR gate 152. An output of the photo coupler 154 is supplied as the start signal to the alarm 20 and gas shut-off valve 22 through a protecting circuit 156. The photo coupler 154 serves to isolate the power sources to the alarm 20 and gas shut-off valve 22 from the power source of the receiver.

The voltage drop detector 46 for the battery observes the voltage of the battery on the basis of the pulse for every about four seconds which is obtained from the counter 120. When the battery voltage drops from 3 V to 2.1 V or less, the detector 46 supplies a detection pulse representing the voltage drop of the battery to the actuating circuit 40 for four seconds at a period of eight seconds. Thus, the actuating circuit 40 outputs a start signal to the alarm 20, thereby lighting up the indicating lamp and making the buzzer operative. At the same time, the gas shut-off valve 22 is closed. The S-8052ALB made by Hattori Seiko Co., Ltd. may be used as the battery voltage drop detector 46.

Figure 11:
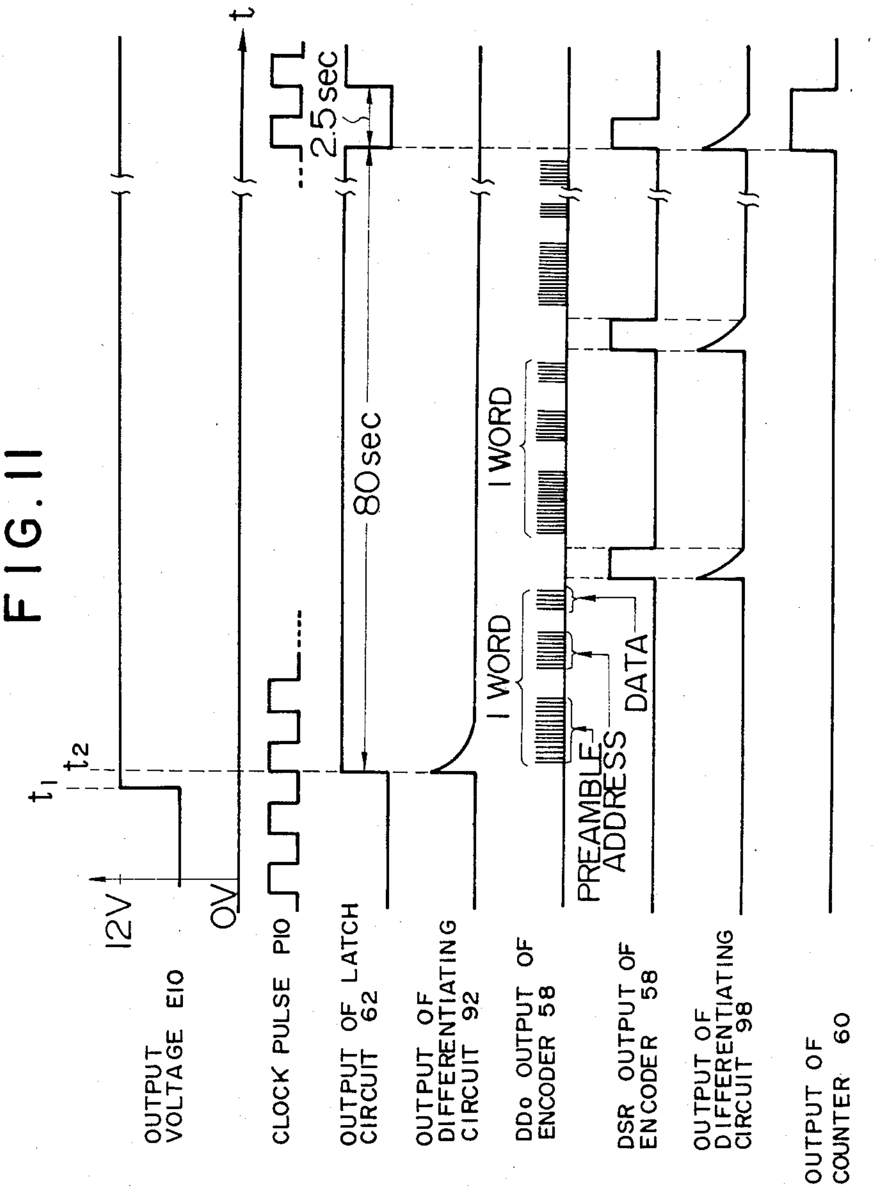
FIG. 11 is a timing chart showing the operation of the transmitter of FIG. 7.

The operation of the receiver of FIG. 7 will then be explained with reference to a timing chart of FIG. 11.

It is now assumed that the leakage of gas is detected at time $t_1$ and the output voltage $E_{10}$ of the leaked gas alarm 10 changes from 6 V to 12 V. In response to the output voltage $E_{10}$ at 12 V, the detecting circuit 24 outputs a leaked gas signal $E_{12}$ and the latch circuit 62 latches the leaked gas signal $E_{12}$ at a timing of time $t_2$ synchronized with the leading edge of the clock pulse $P_{10}$. The latch output Q of the latch circuit 62 actuates the quick start delay off circuit 78 through the OR gate 76. When the delay off circuit 78 is actuated, the switching circuit 80 is immediately turned on, so that the power source is supplied to the transmitting circuit 28. The latch output Q of the latch circuit 62 is also supplied to the differentiating circuit 92. The differentiating circuit 92 supplies the differential pulse to the trigger circuit 94, so that the trigger circuit 94 supplies the trigger signal to start the transmission to the SDI terminal of the encoder 58. At this time, the leaked gas signal $E_{12}$ is supplied through the OR gate 70 to the $D_{15}$ terminal of the encoder 58. Therefore, the encoder 58 supplies the information code pulse as the serial data from the $DD_0$ terminal to the transmitting circuit 28 which is in the operating state. One word of this information code pulse consists of the preamble burst signal, address signal and data signal indicative of the leakage of gas. Thus, the FM radio wave which was frequency modulated by the information code pulse is transmitted from the transmitting antenna 14.

When the encoder 58 outputs the first information code pulse, the encoder 58 generates the pulse signal to the DRS terminal. This pulse signal is differentiated by the differentiating circuit 98 and is supplied to the trigger circuit 94. The trigger circuit 94 supplies the next trigger pulse to the SDI terminal of the encoder 58, thereby allowing the second information code pulse to be transmitted.

In a similar manner as above, the transmission of the information code pulses of 2048 words which are determined by the count value of the counter 65 is repeated for 80 seconds when the power source is continuously supplied to the transmitting circuit 28 from time $t_2$. Upon completion of the transmission of the information code pulses of 2048 words, the value of the counter 65 reaches the full count value, thereby making the initial reset circuit 55 operative. The latch by the latch circuit 62 is released in response to the output of the initial reset circuit 55. Then, the latch circuit 62 latches the leaked gas signal $E_{12}$ at the leading edge of the clock pulse after expiration of one period of the clock pulse $P_{10}$ from the oscillator 64 in a similar manner as in the case at time $t_2$ and restarts the transmitting operation for 80 seconds. This operation is repeated while the leaked gas signal $E_{12}$ is derived.

Figure 12:
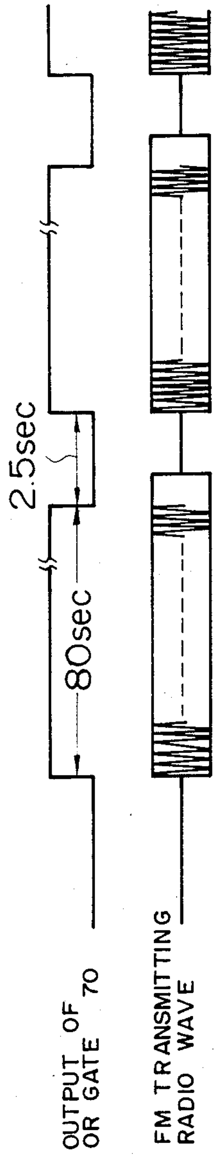
FIG. 12 is a timing chart showing the transmitting operation by the quick start delay off circuit of FIG. 7.

FIG. 12 shows the transmitting state of the FM radio wave by the quick start delay off circuit 78. The leaked gas latch signal is supplied to the delay off circuit 78 through the OR gate 76 for 80 seconds after interruption of 2.5 seconds. The power source is immediately supplied at the leading edge of the output of the OR gate 76 to start the transmission of the FM radio wave. When the output of the OR gate 76 is disconnected, the power source voltage which is applied through the switching circuit 80 is gradually reduced after a predetermined delay time due to the delay off operation. Consequently, after the information code pulse was sent, the carrier wave is transmitted for only a predetermined time and the transmission of the FM radio wave is stopped. This delay off function to slowly reduce the magnitude of the transmitting electric power and stop the power supply contributes to suppress the occurrence of the FM demodulation noise due to the sudden cut off of the transmitting radio wave on the side of the receiver. This delay off function also prevents the malfunction on the side of the receiver due to the large FM demodulation noise which is produced when the FM carrier signal suddenly disappears.

The operation of the receiver of FIG. 9 will then be explained with reference to a timing chart of FIG. 13. The monostable multivibrator 122 generates the pulse of 80 milliseconds for every idle time of 76 seconds based on the count value of the clock pulse in the counter 120 and turns on the switching circuit 126 for 80 milliseconds to supply the power source to the FM receiving circuit 36, thereby setting the intermittent receiving window time.

In such an intermittent receiving state, when the FM transmitting radio wave is received, the information code pulse signal demodulated in the FM receiving circuit 36 is decoded by the decoder 136. Whenever the addresses are determined to be coincident, the decoder 136 outputs the address coincidence signal from the $DD_0$ terminal, so that the address coincidence hold circuit 142 executes the holding operation. On one hand, the DRS terminal of the decoder 136 becomes an H level and the reset state of the leaked gas latch circuit 112 is released.

Figure 13:
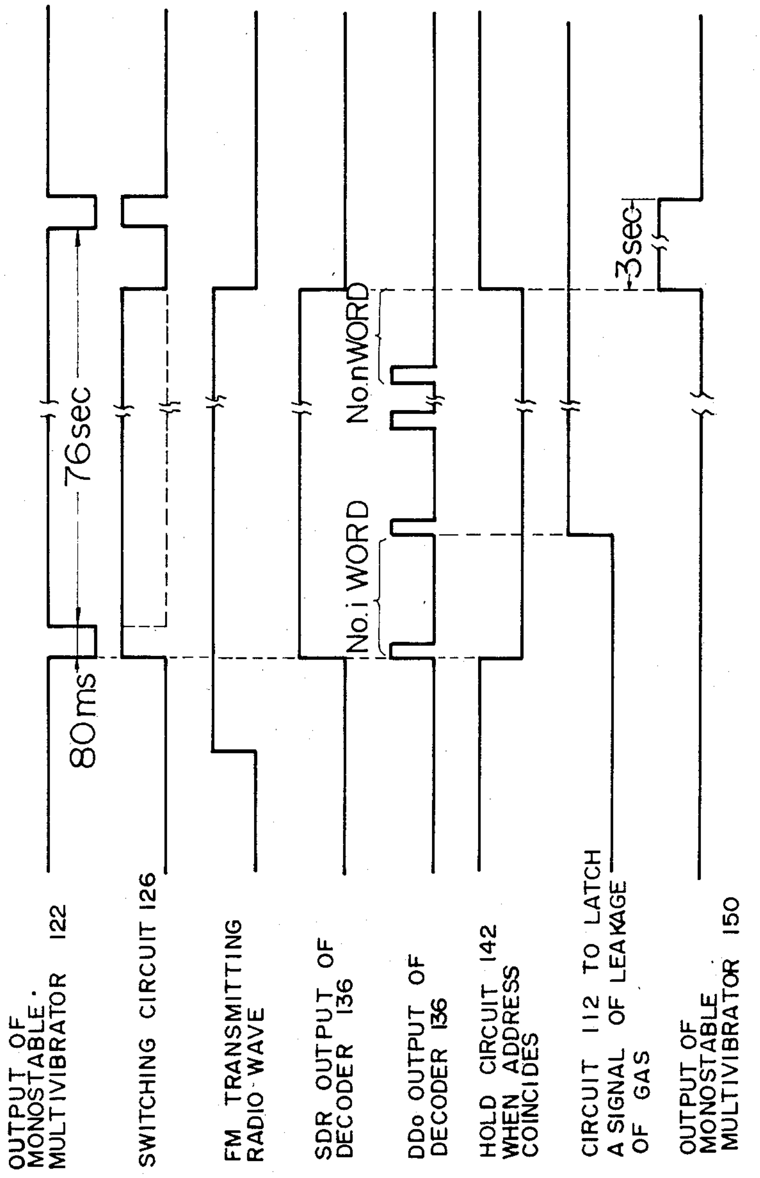
FIG. 13 is a timing chart showing the operation of the receiver of FIG. 9.

FIG. 13 shows the state in that the information code pulse of the i-th word in the FM transmitting radio wave is first received in correspondence to the receiving window time of 80 milliseconds.

First, the decoder 136 discriminates the coincidence of the addresses and decodes the data signal included in the information code pulse. When the leakage of gas is discriminated, the decoder 136 outputs signals to the DC and SDO terminals, so that the latch operation is performed by the leaked gas signal latch circuit 112 and the leaked gas signal latch output is supplied to the AND gate 148. At this time, the address coincidence hold circuit 142 generates the L-level output to keep the switching circuit 126 in the ON state. During the holding operation by the hold circuit 142, the AND gate 148 is maintained in the forbidden state.

Subsequently, upon completion of the discrimination of the information code pulse of the last n-th word in the decoder 136, the hold circuit 142 releases the holding operation and the output returns from an L level to an H level. Due to this, the output of the AND gate 148 rises to an H level and triggers the monostable multivibrator 150 and outputs the pulse of three seconds to the actuating circuit 40, thereby making the alarm 20 and gas shut-off valve 22 operative.

When the FM radio wave is received from another housing, the address coincidence signal is not obtained. Therefore, the switching circuit 126 is turned on for only the predetermined receiving window time of 80 milliseconds, thereby enabling the radio interference due to an FM radio wave from another housing to be certainly prevented by discriminating the address.

On the other hand, in the state whereby no FM radio wave is received, the power source is supplied to the FM receiving circuit 36 for only 80 milliseconds after the elapse of the idle time of 76 seconds. Therefore, even if the lithium battery 110 is used as the power source, the receiving electric power consumption is extremely small, so that this makes it possible to assure about ten years as the service life of the battery.

Figure 14:
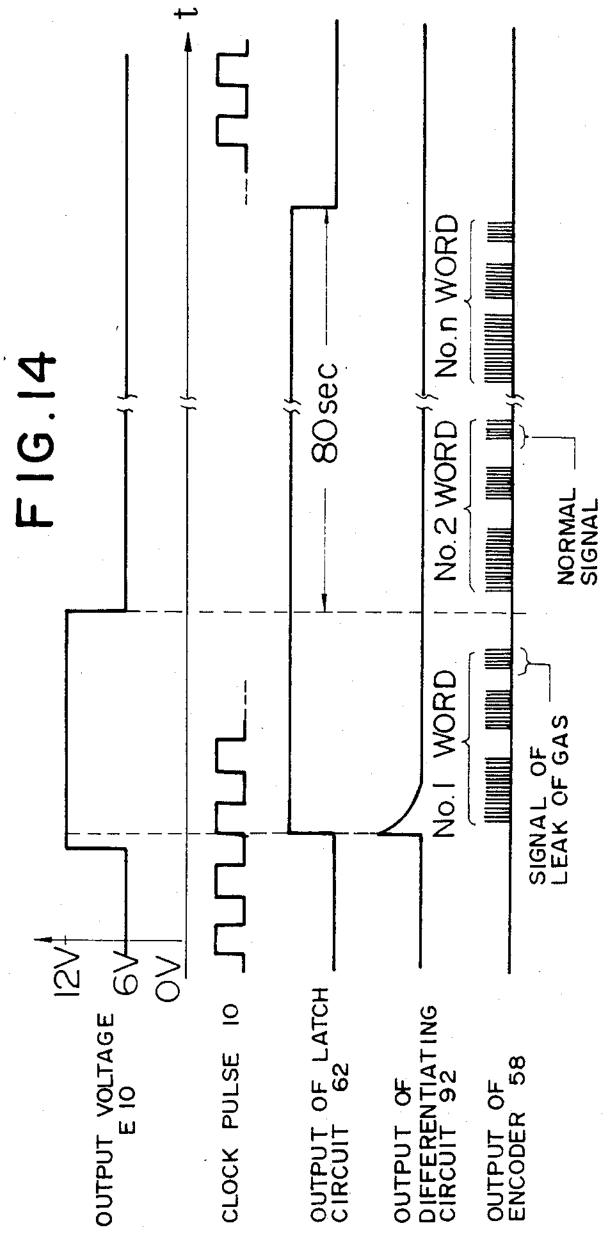
FIG. 14 is a timing chart showing the operation of another embodiment of the receiver to perform one transmitting operation.

FIG. 14 is a timing chart showing the transmitting operation according to another embodiment of the transmitting circuit. A feature of the transmitter which performs this transmitting operation is that when the room condition immediately returns to the normal condition after the leakage of gas was detected in the foregoing embodiment, the normal information code pulse is transmitted by the FM radio wave for only 80 seconds subsequent to the leaked gas information pulse.

To realize this transmitting operation shown in FIG. 14, the detecting circuit 24 in FIG. 7 is provided with: a normal detecting circuit to discriminate the normal output at 6 V which is arranged in parallel with the leaked gas detector 68; a differentiating circuit to detect that the output signal changes from 6 V to 12 V (i.e., from the normal condition to the leaked gas condition) or from 12 V to 6 V (i.e., from the leaked gas condition to the normal condition); and a one-shot circuit (retriggerable monostable multivibrator) to make the oscillator 64 operative for only the constant time (80 seconds) in response to an output of that differentiating circuit.

Namely, when the detecting circuit 24 detects the leakage of gas, the one-shot circuit operates in response to the output from the differentiating circuit, thereby making the oscillator 64 operative for only the constant time (80 seconds).

When the room condition returns to the normal condition during the transmission of the information code pulse representing that the leakage of gas is detected, the output from the differentiating circuit is sent to the one-shot circuit, so that the one-shot circuit subsequently makes the oscillator 64 operative for only the constant time (80 seconds).

Although the normal detecting circuit is connected to the delay circuit 72 similarly to the leaked gas detecting circuit, it is connected to the encoder 58 through a terminal to transmit the normal information code pulse.

Figure 15:
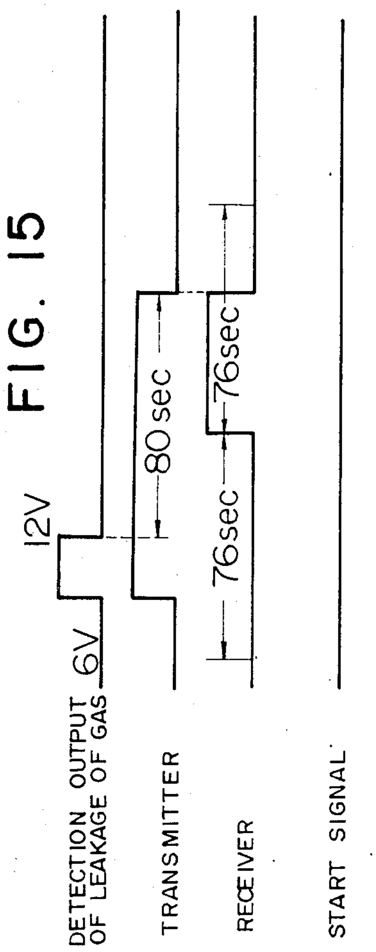
FIG. 15 is a general timing chart showing the transmitting and receiving operations when the transmitting operation in FIG. 4 is performed.

FIG. 15 is a general timing chart for the transmitting and receiving operations when the transmitter to perform the transmitting operation of FIG. 14 is used. When the leakage of gas is detected, the FM radio wave is transmitted for 80 seconds. However, in the case where the room condition changes to the normal condition during this transmission, the normal information code pulse is transmitted by the FM radio wave for 80 seconds subsequent to the leaked gas information code pulse.

Since the receiver performs the discrimination by the last information code pulse at the end of the transmitting radio wave, the discrimination output of the leaked gas signal cannot be obtained from the decoder 136 in the receiver because the transmitting radio wave is the normal information code pulse. Thus, no start signal is generated and an alarm is not indicated and the gas shut-off valve is not closed.

Figure 16:
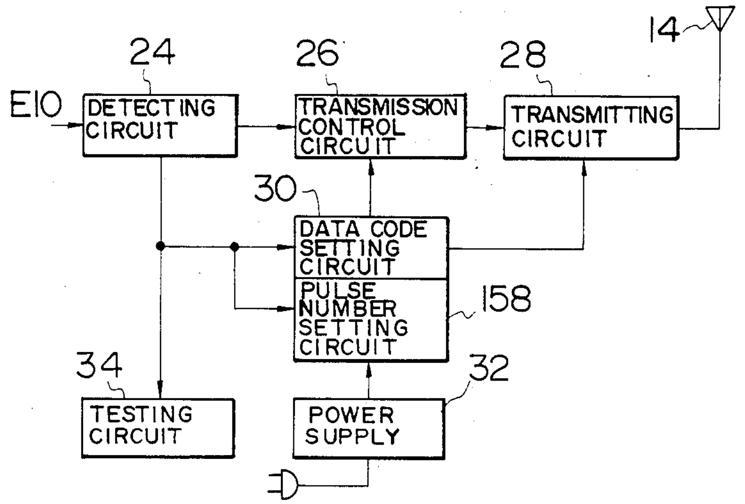
FIG. 16 is a block diagram showing another embodiment of the transmitter.

FIG. 16 is a block diagram showing another embodiment of the transmitter of the present invention. A feature of this embodiment is that a pulse number setting circuit 158 is added to the transmitter of FIG. 2 and the other circuit sections are the same as the transmitter of FIG. 2.

Figure 17:
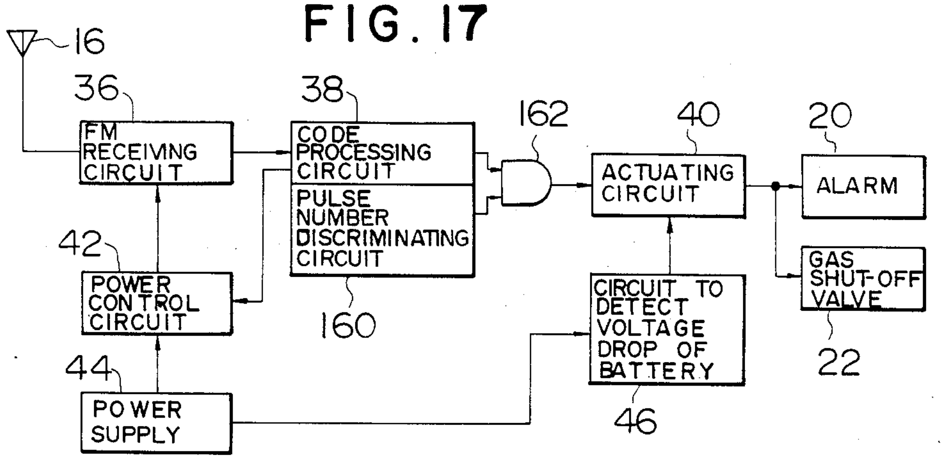
FIG. 17 is a block diagram showing another embodiment of the receiver.

FIG. 17 is a block diagram showing another receiver of the present invention which is used in combination with the transmitter of FIG. 16. A feature of this receiver is that a pulse number discriminating circuit 160 is added to the receiver of FIG. 3 and the output of the code processing circuit 38 and the output of the pulse number discriminating circuit 160 are inputted to an AND gate 162, then the actuating circuit 40 is made operative in response to an output of the AND gate 162. The other circuit sections are the same as the receiver of FIG. 3.

Figure 18:
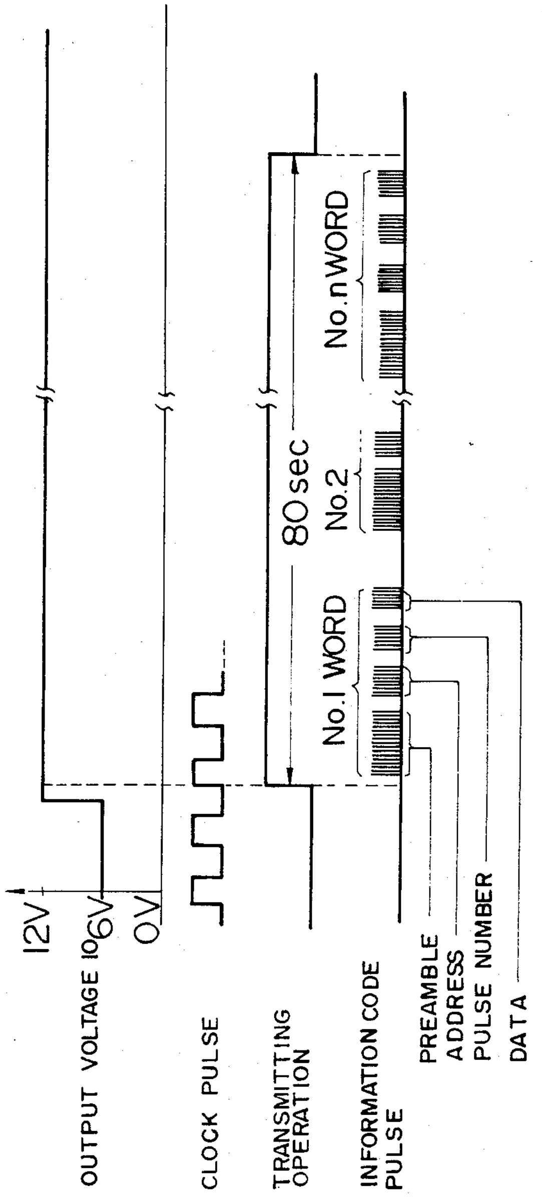
FIG. 18 is a timing chart showing the transmitting operation in the embodiment of FIG. 16.

In the alarm system using the transmitter and receiver shown in FIGS. 16 and 17, as will be obviously understood from a timing chart of FIG. 18 showing the operation of the transmitter, as a character arrangement of a plurality of information code pulses which are transmitted for 80 seconds when the leakage of gas is detected, the pulse number information code representing the number of word is added in addition to the preamble burst signal, address signal and data signal. The addition of the pulse number information to the information code pulse which is transmitted by the FM radio wave in this way makes it possible to discriminate the reception of the last information code pulse by the pulse number discriminating circuit 160 in the receiver of FIG. 17. In response to the output of the AND gate 162 when the last pulse number n was discriminated, the actuating circuit 40 enables the alarm 20 to indicate an alarm and enables the gas shut-off valve 22 to closed.

Figure 19:
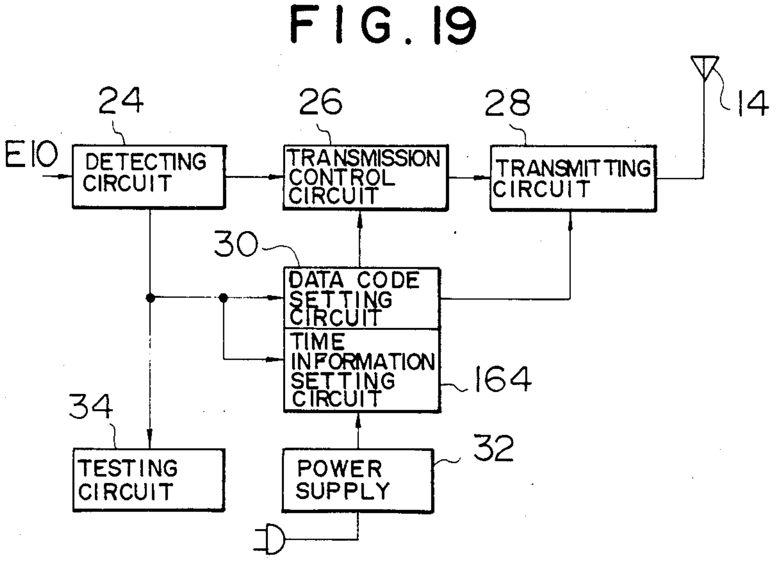
FIG. 19 is a block diagram showing still another embodiment of the transmitter.

FIG. 19 shows still another embodiment of the transmitter for use in the present invention. A feature of this embodiment is that a time information setting circuit 164 is added to the transmitter of FIG. 2.

Figure 20:
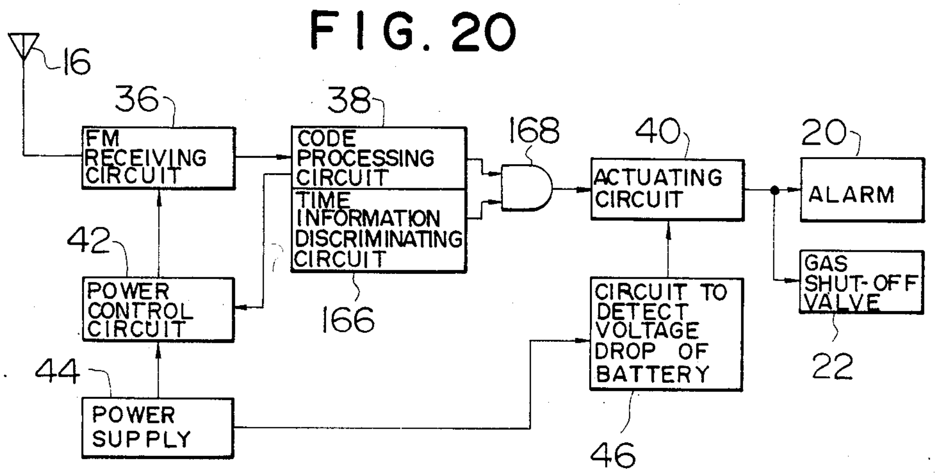
FIG. 20 is a block diagram showing still another embodiment of the receiver.

FIG. 20 shows still another embodiment of the receiver which is used in combination with the transmitter of FIG. 19. A feature of this receiver is that a time information discriminating circuit 166 is added to the receiver of FIG. 3, and the output of the code processing circuit 38 and the output of the time information discriminating circuit 166 are inputted to an AND gate 168, then the actuating circuit 40 is made operative by an output of the AND gate 168.

Figure 21:
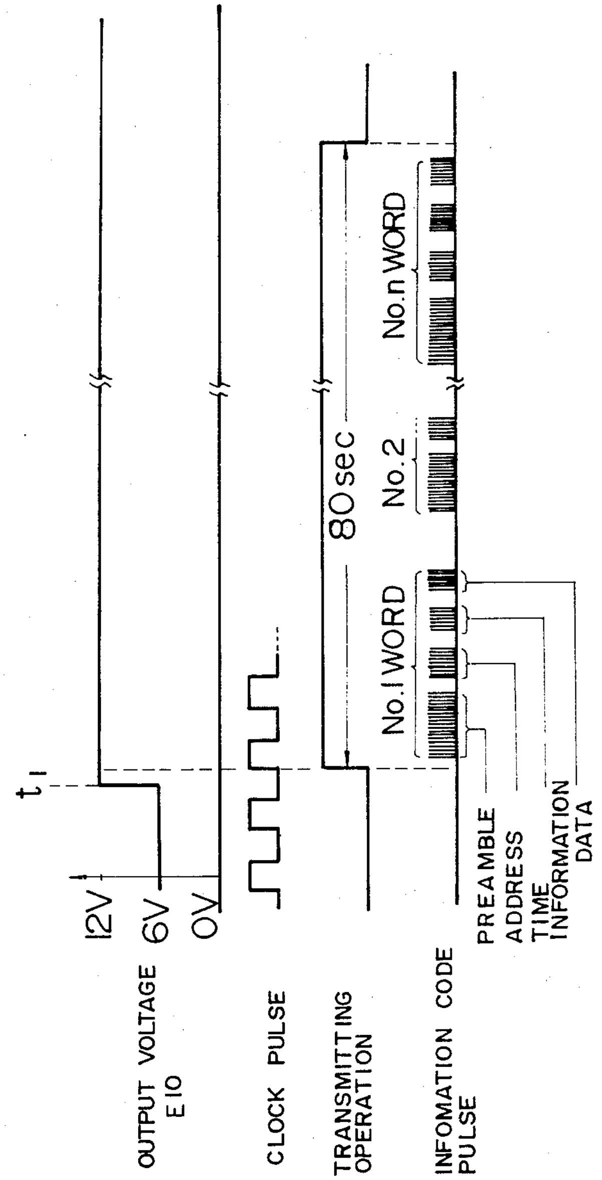
FIG. 21 is a timing chart showing the operation of the receiver of FIG. 19.

In the alarm system consisting of the transmitter and receiver shown in FIGS. 19 and 20, as will be understood from a timing chart of FIG. 21 showing the transmitting operation, with respect to each of the information code pulses consisting of the first to n-th (Nos. 1 to n) words which are repeatedly outputted for 80 seconds when the leakage of gas is detected, the time information code representing the elapse of time from time $t_1$ when the leakage of gas is detected is added in addition to the preamble burst signal, address signal and data signal. By transmitting the information code pulse including this time information code, the elapse of time from the leaked gas detection time $t_1$ can be discriminated by the time information discriminating circuit 166 provided in the receiver.

Figure 22:
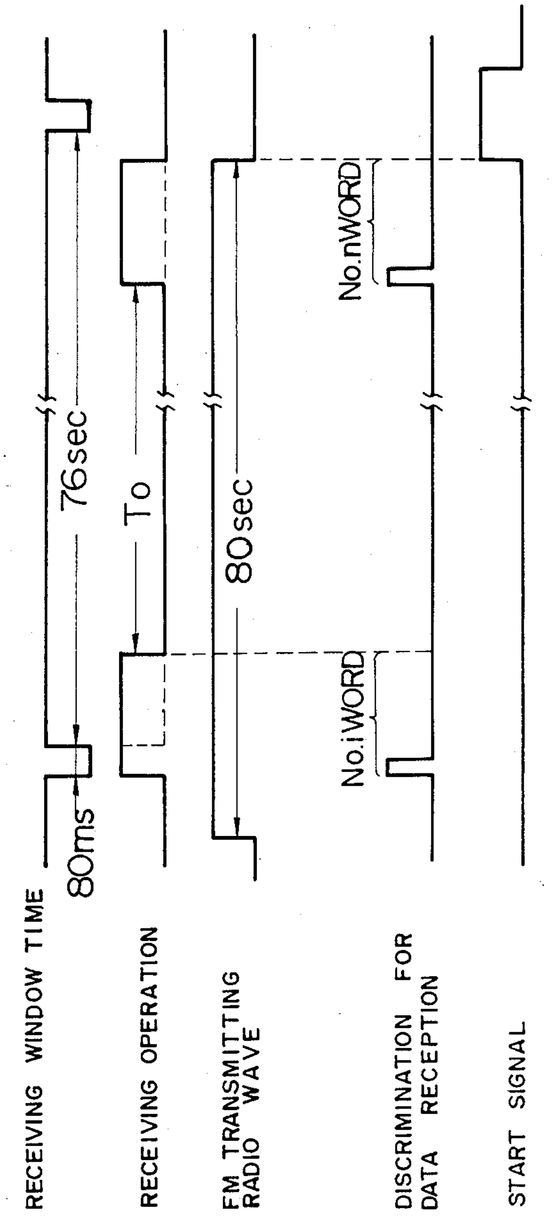
FIG. 22 is a timing chart showing the receiving operation of the receiver of FIG. 20.

Therefore, as shown in FIG. 22, the receiver calculates a residual time $T_0$ from the time information code included in the information code pulse of the i-th word received first at the receiving window time of 80 milliseconds until the last information code pulse is received. The power supply to the FM receiving circuit 36 by the power control circuit 42 is stopped for this time $T_0$. The power source is supplied to the FM receiving circuit 36 from the power control circuit 42 after expiration of the residual time $T_0$ to receive the last information code pulse. The start signal is outputted in response to the last information code pulse (i.e., the n-th pulse) received, thereby allowing an alarm indicative of the leakage of gas to be indicated and closing the gas shut-off valve.

Consequently, with regard to the receiving operation time by the FM receiving circuit 36 in the receiver, the power source is supplied only for the receiving time of the first information code pulse which coincides with the receiving window time and for the receiving time of the last information code pulse. Thus, an electric power consumption in the receiver can be further reduced and the service life of the lithium battery built in the receiver can be further extended.

In the foregoing embodiments, the transmitting time of the transmitter is 80 seconds when the leakage of gas is detected and the interval between the receiving window times in the receiver is 76 seconds. However, these time intervals may be arbitrarily set to proper values if there is a relation such that the transmitting time is longer and the idle time of the receiving window is shorter.

On the other hand, the foregoing embodiments have been described with regard to the example whereby the leaked gas detection information is used as the detection information. However, it is also possible to transmit fire detection information by a fire alarm or theft detection information by a theft detector as the detection information. Further, as well as only one kind of detection information, a plurality of data bits representing the leakage of gas, fire, theft, etc. are provided for the signal bits of the data signal and a plurality of kinds of detection information may be simultaneously transmitted.

What is claimed is:

1. An alarm system for transmitting detection information detected by a detector from a transmitter to a receiver via a radio system and thereby outputting an alarm, wherein said transmitter comprises:

an abonormality detecting means for detecting an abnormal condition;

and a transmitting means connected to said abnormality detecting means for continuously transmitting a transmission signal of one word including at least detection information and address information a plurality of times for a constant transmission time interval when a detection output of said abnormality detecting means is obtained;

and wherein said receiver comprises:

a power control means for setting a receiving window time by intermittently supplying power to a receiving circuit at a period of a constant receiving idle time;

a reception processing means which, when a coincidence of a self address is determined from a reception word signal derived from the receiving operation within said receiving window time, elongates the receiving window time set by said power control means for a constant time period from the determination of said address coincidence until the coincidence of the self address is determined on the basis of the next reception word signal, and an alarm output means for outputting an alarm signal on the basis of the detection information included in the last reception word signal received due to the elongation of the receiving window time by said reception processing means.

2. An alarm system according to claim 1, wherein the receiving idle time of said receiver is set to a time which is equal to or shorter than the transmission time of said transmitter.

3. An alarm system according to claim 1, wherein said transmitting means is provided with a transmission control means for repeating the transmitting operation to continuously transmit the transmission signal of one word for a plurality of times for a constant time period while the abnormality detection signal of said abnormality detecting means is derived.

4. An alarm system according to claim 1, wherein said transmitting means is provided with a means for changing a detecting code signal included in said transmission word signal to a code signal in the normal condition and continuing the transmission when the detection output of said abnormality detecting means returns to the normal condition during the transmitting operation for the constant time period.

5. An alarm system according to claim 1, wherein said receiver further comprises:

a battery voltage observing means for observing a voltage drop of a battery and for generating an alarm signal when the battery voltage drops to or below a predetermined voltage, and a means for closing a gas shut-off valve in response to said alarm signal output.

6. An alarm system according to claim 1, wherein said transmitter has a means for adding number information indicative of an order of the transmission of the word signal to each of said plurality of word signals which are transmitted for the constant transmission time period and transmitting the word signals including said number information, and wherein said receiver has a means for discriminating the reception of the last word signal from the number information of the reception word signal and generating the alarm signal based on said detection information.

7. An alarm system according to claim 1, wherein said transmitter has a means for adding time information indicative of an elapsed time from the detection of the adnormal condition to each of said plurality of word signals which are transmitted for the constant transmission time period and transmitting said word signals including said time information, and wherein said receiver has a means for calculating an idle time until the reception of the last word signal is started on the basis of the time information of the word signal which is first received at a timing of the receiving window time, and for stopping the receiving operation for said idle time, and for restarting the receiving operation after an expiration of said receiving idle time, and then receiving the last word signal.

* * * * *